(No Model.) 2 Sheets—Sheet 1.
J. ADT.
MACHINE FOR MAKING SPLIT KEYS.
No. 261,977. Patented Aug. 1, 1882.
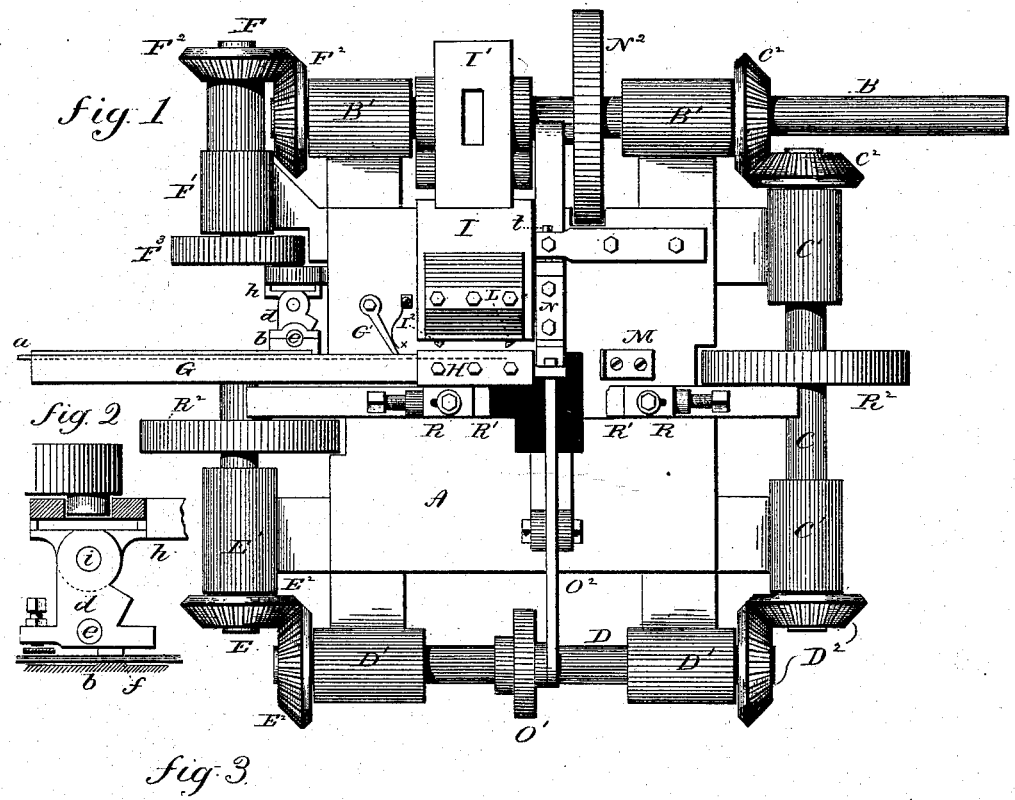

(No Model.)　　　　　　　　　　　　　　　　　　　2 Sheets—Sheet 2.
J. ADT.
MACHINE FOR MAKING SPLIT KEYS.
No. 261,977.　　　　　　　　　　　　　Patented Aug. 1, 1882.
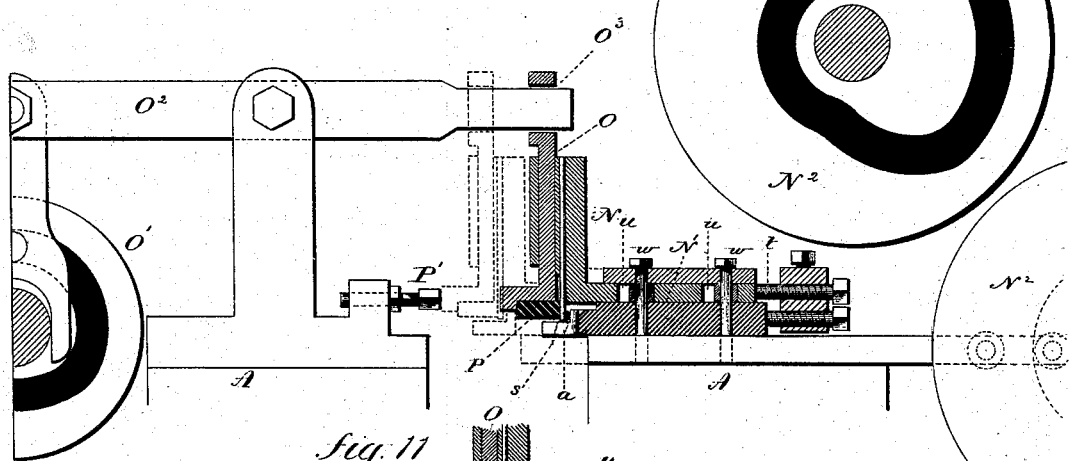
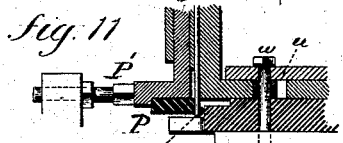
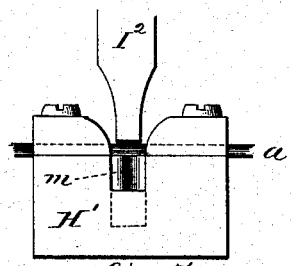
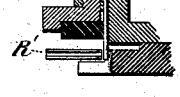
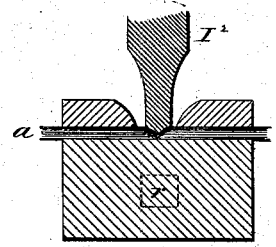
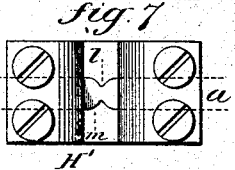
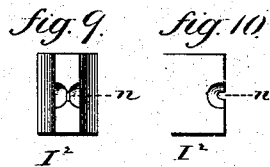
Witnesses.　　　　　　　　　　　　　　　John Adt.
　　　　　　　　　　　　　　　　　　　　　Inventor
　　　　　　　　　　　　　　　By Atty.

UNITED STATES PATENT OFFICE.

JOHN ADT, OF NEW HAVEN, CONNECTICUT.

MACHINE FOR MAKING SPLIT KEYS.

SPECIFICATION forming part of Letters Patent No. 261,977, dated August 1, 1882.

Application filed March 17, 1882. (No model.)

*To all whom it may concern:*

Be it known that I, JOHN ADT, of New Haven, in the county of New Haven and State of Connecticut, have invented a new Improvement in Machines for Manufacturing Spring-Keys; and I do hereby declare the following, when taken in connection with accompanying two sheets of drawings and the letters of reference marked thereon, to be a full, clear, and exact description of the same, and which said drawings constitute part of this specification, and represent, in—

Figure 1, a top or plan view; Fig. 2, a transverse section through the former; Figs. 3 to 14, inclusive, detached views to illustrate the invention; Fig. 15, the finished key.

This invention relates to the construction of a machine for the manufacture of the articles commonly called "spring-keys," or "cotter-pins"—that is to say, for illustration, a key made for insertion through a hole in an axle, for the purpose of preventing the wheel from escaping therefrom, and which are made from half-round wire bent so as to bring the flat surfaces together, the ends held together for insertion through the hole, so that when the two ends have passed through the hole they will spring apart and prevent the accidental removal of the key, the double end forming a spring as well as a head to prevent the key from passing entirely through the hole into which it is inserted, such as seen in Fig. 15, the object of the invention being to receive the half-round wire from the coil, feed it to the machine the required length, shape the points of the two legs, bend the blank into the finished shape, and then deliver the finished key from the machine, the operations of the machine being successive and automatic; and the invention consists in the combination of mechanism whereby the operations are successively and automatically performed, as more fully hereinafter described, and particularly recited in the claims.

A represents the bed-plate of the machine, upon which the operative mechanism is arranged.

B is the principal driving-shaft, arranged so as to revolve freely in bearings B′, to which power is applied through pulleys or gearing in the usual manner for driving such automatic machinery. At right angles to the driving-shaft is a second shaft, C, arranged in bearings C′, to which power is communicated by bevel-gears C² from the driving-shaft. On the side opposite the driving-shaft is a third shaft, D, arranged in bearings D′, which receives its revolving motion through bevel-gears D² from the shaft C. Again, upon the side of the machine opposite the shaft C is another shaft, E, arranged in a bearing, E′, to which revolution is imparted from the shaft D through bevel-gears E². This shaft E is short—that is, it does not extend across that side of the machine; but on that same side of the machine is another shaft, F, arranged in a bearing, F′, which is connected to the driving-shaft, so as to revolve with it, by means of bevel-gears F².

G is the guide through which the wire $a$ is run, in connection with which is a feed arranged to move longitudinally in the said guide G to the extent required for the feed of the wire. This feed may be any of the usual wire-feeds. As illustrated in Fig. 1, it consists of a slide, $b$, through which the wire runs, and in which a clamp, $d$, is hung. (Shown enlarged in Fig. 2.) This clamp is hung in the slide $b$ upon the pivot $e$, and so as to vibrate upon that pivot, and is provided with a bearing, $f$, forward of the pivot, so that when the clamp is pressed forward it will grip the wire, as seen in Fig. 2; but when moved in the opposite direction it will relax its grasp upon the wire so as to be freely moved backward. The clamp is hung to a slide, $h$, by a joint, $i$, which moves in suitable guides parallel with the guide G, and is caused so to move by its connection with a crank, imparting a reciprocating movement to the slide $h$, and through it to the clamp and slide $b$. In one direction it grasps the wire and causes it to be moved to the extent of the throw of the crank, and, returning, releases its grasp upon the wire and moves back, leaving the wire free. Other feeding devices, however, may be substituted for this device shown, the particular construction of the feed forming no essential part of my invention.

To prevent the possibility of the wire slipping back after it has been fed, a cam-like dog, G′, is arranged, which permits the free forward movement of the wire, but grips it to prevent its return. As the wire is fed in it passes through the die-holder H and over the die H', as seen in Fig. 3, where the first operation is performed.

The ends of the two legs of the key, as seen in Fig. 15, require to be chamfered or tapered upon the half-round side, so as to facilitate the insertion of the key. The first operation after feeding is to shape this end. In this operation I shape one end of two blanks at the same time, as seen in Figs. 4 and 5, Fig. 4 showing the half-round side of the wire and Fig. 5 an edge view. The wire is cut and swaged to give the requisite taper to the two ends, which operation forms a semi-annular V-shaped groove, $l$, in the semi-cylindrical portion of the wire, as clearly seen in Figs. 4 and 5. Then the separation of the wire at the center of this V-shaped groove will complete the pointing of one end of two distinct blanks, as one part forms the end of one blank and the other the end of the next blank. To thus shape the wire it passes over the die H', as seen in Fig. 3. This die is seen enlarged in Figs. 6, 7, and 8, Fig. 6 showing a side view, Fig. 7 a face view, and Fig. 8 a longitudinal section, the passage for the wire being indicated in broken lines. In this die and in the path of the wire is the working part $m$ of the die. The two sides of this part $m$ are shaped corresponding to the V-shape $l$ required to be made in the edge of the wire. Upon the opposite side of the wire is a slide, I, which receives a reciprocating movement from a cam, I', on the driving-shaft toward and from the die-holder H. This slide carries the other part, $I^2$, of the die for making the V-shaped groove in the wire. This part $I^2$ is seen enlarged in Figs. 6, 8, 9, and 10, Fig. 6 showing a top or upper side view, Fig. 8 a longitudinal central section, Fig. 9 face view, and Fig. 10 an edge view. The face of the die, as seen in Figs. 9 and 10, has a cavity, $n$, corresponding to the form to be given to the wire. Hence when the part $I^2$ of the die is forced upon the wire it swages the latter into a shape corresponding to the cavity in the part $I^2$ of the die, cutting away the surplus metal at the sides over the edges of the working-face $m$ of the other part of the die, the cuttings or waste passing out through an opening, $r$, in the die-block H'. The groove thus formed in the wire, the movable part of the die is drawn back. Then the feed takes place, carrying the wire the length required for the blank. Then these dies again operate as before, this operation completing the end of the first blank and forming the first end of the next blank, and so on. At the point where the last-formed groove $l$ lies in the die-holder H a cutter, L, is arranged upon the same slide I, which will cut the completely-formed blank from the wire in the center of the groove $l$, as seen in Fig. 3, leaving the blank with its two ends properly formed, ready for the next operation of bending.

To insure the proper presentation of the wire so that the required length only may be fed, I arrange a stop, M, against which the end of the wire will abut as it is fed in, as seen in Fig. 3. The wire as it passes beyond the cutter comes in rear of the former $s$, as seen in Fig. 3. This former is a rod corresponding to the eye of the key or pin to be formed, and is supported in a holder, N, arranged upon a slide, N', to which a reciprocating movement is imparted from a cam-wheel, $N^2$, on the driving-shaft B, for the purpose hereinafter described. The rear position of the former, as seen in Fig. 3, is such that the flat side of the blank will lie in close contact with its rear surface, also as seen in Figs. 2 and 11. The rear position of the holder N, which supports the former, is adjusted by means of a set-screw, $t$. The connection of the holder N with the slide N' is such as to permit the slide N' to retreat after the holder N has been arrested by the set-screw $t$. This over, motion is permitted by the slots $u$ in the holder, through which bolts $w$ pass. The slide N' has upon its face a vertical groove, $a'$, directly in rear of the former, as seen in Fig. 3, so that after the blank has been cut off the slide N' advances until it comes against the rounded surface of the blank, grasping the blank between its front face and the former, then with the former carries the blank forward to the position indicated in broken lines, Fig. 3, at which point the further advance of the former is arrested. Then the slide continues its advance, its groove $a'$ forcing the wire to bend around the former, as seen in Fig. 12, thus making the preliminary bend. To sustain the former, which is necessarily small during this bending operation, I arrange a vertical slide, O, in connection with the holder N, to which a vertical reciprocating movement is imparted by means of a cam, O', on the shaft D, through a lever, $O^2$, as seen in Fig. 2, the connection between the lever $O^2$ and the vertical slide O being such that the slide O may move horizontally with the former-holder N, which is done by permitting the end of the lever $O^2$ to work freely through an eye, $O^3$, in the upper end of the slide O. This slide O carries a bearing-piece, P, at its lower end, directly in front, so as to bear against the former $s$, as seen in Figs. 2 and 11, and down in front of the former for this preliminary bend. The slide O brings up against a set-screw or stop, P', as seen in Fig. 11 and in broken lines, Fig. 2, which arrests the former at the point where the bending is to begin, while the slide N' advances and makes the preliminary bend, as seen in Fig. 12. The support P is shaped as seen in Fig. 12, so as to permit the sides of the blank to approach each other. After this preliminary bend has been made, then the slide O rises by the action of the cam O' out of its position between the two legs of the bent blank, leaving that blank free for the next operation, as indicated in single broken lines 2 2, Fig. 3. In a plane corresponding to the two legs of this preliminarily bent blank slides R are arranged, one at each side, and each carrying a bending-die, R', the face of which is grooved, as seen in Fig. 13, corresponding to the half-round surface of the blank, and also so shaped as to give the desired form at the junction of the legs with the eye.

To the slides R R a reciprocating movement is imparted respectively by cams R² on the shafts C E. As they are advanced they force the bending-dies R' against the legs of the blank, bringing the two legs together, and close the eye around the former, as seen in Fig. 14, which completes the key. Then the slide O is forced downward to bring the bearing-piece P again in front of the former, and in so doing it strikes the finished key and forces it from the former, the former, its bearing-piece, and the benders moving back to receive the next blank, and, so continuing, the successive blanks are shaped as bent and the key completed and delivered from the machine.

It will be understood that the parts of the machine are made adjustable to adapt it to the manufacture of keys of various sizes in the usual manner for adjusting other machines for like purposes.

The shaping of the ends of the blanks—that is, forming the groove $l$ in the wire—may be made in a machine independent of the bending devices, and then the blanks cut and taken to another machine which shall perform the bending; or the blanks may be otherwise bent. Again, the shaping of the ends—that is, forming the groove $l$ and cutting the blanks from the wire—may be done in one machine and then the bending done in another. I therefore do not wish to limit my invention to the successive operation of the several parts.

What I claim is—

1. The combination of the following elements: a feed to deliver the requisite length of wire and a die arranged to swage and form a semi-annular groove, $l$, in and around the half-round of the wire, substantially as described.

2. The combination of the following elements: a feed to deliver the requisite length of wire, a die arranged to swage and form a semi-annular groove, $l$, in and around the half-round of the wire, and a cutter arranged to separate the blanks at the groove so formed, substantially as described.

3. The combination of the former $s$, to which the flat surface of the blank is presented, the bearing-piece P, presented in front of the former, and the bender N' to produce the preliminary bend, substantially as described.

4. The combination of the former $s$, the bender N', the bearing-piece P, and mechanism, substantially such as described, to present the said bearing-piece to support the former during the preliminary bend, and then remove it therefrom, with the side benders, R', to complete the key, substantially as described.

5. The combination of the following elements: a feed to deliver the requisite length of wire, a die arranged to swage and form a semi-annular groove, $l$, upon the half-round of the wire, a cutter arranged to separate the blanks at the groove so formed, a former, $s$, to which the flat surface of the blank is presented, a bearing-piece, P, presented in front of the former, and the bender N', to produce the preliminary bend, substantially as described.

6. The combination of the following elements: a feed to deliver the requisite length of wire, a die arranged to swage and form a semi-annular groove, $l$, upon the half-round of the wire, a cutter arranged to separate the blanks at the groove so formed, a former, $s$, to which the flat surface of the blank is presented, a bearing-piece, P, in front of the former, the bender N' to produce the preliminary bend, and mechanism, substantially such as described, to present the said bearing-piece to support the former during the preliminary bend, and then remove it therefrom, with the side benders, R', to complete the key, substantially as described.

JOHN ADT.

Witnesses:
JOHN E. EARLE,
LILLIAN D. ROGERS.